(12) United States Patent
Susnjara

(10) Patent No.: US 12,233,586 B2
(45) Date of Patent: Feb. 25, 2025

(54) MACHINE AND METHOD FOR FORMING ARTICLES

(71) Applicant: Thermwood Corporation, Dale (IN)

(72) Inventor: Kenneth J. Susnjara, Birdseye, IN (US)

(73) Assignee: Thermwood Corporation, Dale, IN (US)

(*) Notice: Subject to any disclaimer, the term of this patent is extended or adjusted under 35 U.S.C. 154(b) by 0 days.

(21) Appl. No.: 18/529,979

(22) Filed: Dec. 5, 2023

(65) Prior Publication Data

US 2024/0123669 A1 Apr. 18, 2024

Related U.S. Application Data

(63) Continuation of application No. 18/045,048, filed on Oct. 7, 2022, now Pat. No. 11,865,760, which is a
(Continued)

(51) Int. Cl.
| | |
|---|---|
| *B29C 48/18* | (2019.01) |
| *B29C 43/20* | (2006.01) |
| *B29C 64/106* | (2017.01) |
| *B29C 64/118* | (2017.01) |
| *B29C 64/188* | (2017.01) |
| *B29C 64/20* | (2017.01) |

(Continued)

(52) U.S. Cl.
CPC ............ *B29C 48/18* (2019.02); *B29C 43/203* (2013.01); *B29C 64/106* (2017.08); *B29C 64/118* (2017.08); *B29C 64/188* (2017.08); *B29C 64/20* (2017.08); *B29C 64/209* (2017.08); *B29C 64/236* (2017.08); *B29C 64/25* (2017.08); *B29C 70/38* (2013.01); *B29L 2009/00* (2013.01)

(58) Field of Classification Search
CPC ... B29C 64/106; B29C 64/118; B29C 64/188; B29C 64/20; B29C 64/209; B29C 64/236; B29C 64/25; B29C 48/18; B29C 43/203; B29C 70/38
See application file for complete search history.

(56) References Cited

U.S. PATENT DOCUMENTS

| | | | |
|---|---|---|---|
| 4,588,872 A | 5/1986 | Bollinger et al. | |
| 4,909,880 A | 3/1990 | Kittelson et al. | |

(Continued)

FOREIGN PATENT DOCUMENTS

WO      2013064826 A1     5/2013

OTHER PUBLICATIONS

International Search Report and Written Opinion in corresponding International Application No. PCT/US2016/044159, dated Oct. 19, 2016, 13 pages.

(Continued)

*Primary Examiner* — Nahida Sultana
*Assistant Examiner* — Mohamed K Ahmed Ali
(74) *Attorney, Agent, or Firm* — Bookoff McAndrews, PLLC

(57) ABSTRACT

A machine and method of forming an article generally comprising extruding a molten bead of thermoplastic material along x, y and z axes in forming an article consisting of a strata of such material, and passing a roller over each applied portion of such molten bead to compress such bead portion, enhancing the fusion of engaging plies of such extruded material.

19 Claims, 6 Drawing Sheets

Related U.S. Application Data continuation of application No. 17/322,540, filed on May 17, 2021, now Pat. No. 11,491,696, which is a continuation of application No. 16/861,490, filed on Apr. 29, 2020, now Pat. No. 11,014,279, which is a continuation of application No. 16/403,079, filed on May 3, 2019, now Pat. No. 10,668,657, which is a continuation of application No. 14/980,818, filed on Dec. 28, 2015, now Pat. No. 10,611,073.

(51) Int. Cl.
| | | |
|---|---|---|
| *B29C 64/209* | (2017.01) | |
| *B29C 64/236* | (2017.01) | |
| *B29C 64/25* | (2017.01) | |
| *B29C 70/38* | (2006.01) | |
| *B29L 9/00* | (2006.01) | |

(56) References Cited

U.S. PATENT DOCUMENTS

| | | |
|---|---|---|
| 5,700,347 A | 12/1997 | Mccowin |
| 6,004,124 A | 12/1999 | Swanson et al. |
| 7,731,816 B2 | 6/2010 | Oldani et al. |
| 7,810,539 B2 | 10/2010 | Mischler et al. |
| 8,151,854 B2 | 4/2012 | Oldani |
| 8,534,338 B2 | 9/2013 | Oldani et al. |
| 8,954,180 B2 | 2/2015 | Oldani |
| 2004/0164436 A1 | 8/2004 | Khoshnevis |
| 2005/0104241 A1 | 5/2005 | Kritchman et al. |
| 2005/0141975 A1 | 6/2005 | Hardesty et al. |
| 2007/0044899 A1 | 3/2007 | Tingley et al. |
| 2007/0044919 A1 | 3/2007 | Hoffmann |
| 2008/0006017 A1 | 1/2008 | Rindels |
| 2010/0200168 A1 | 8/2010 | Oldani et al. |
| 2010/0206224 A1 | 8/2010 | Thurner et al. |
| 2010/0318222 A1 | 12/2010 | Khoshnevis |
| 2011/0203737 A1* | 8/2011 | Slyne .................... B29C 70/388 156/358 |
| 2012/0022281 A1 | 1/2012 | Dubey et al. |
| 2012/0222810 A1 | 9/2012 | Vaniglia |
| 2013/0142898 A1 | 6/2013 | Vaniglia |
| 2013/0197683 A1 | 8/2013 | Zhang et al. |
| 2015/0048553 A1 | 2/2015 | Dietrich et al. |
| 2015/0108677 A1 | 4/2015 | Mark et al. |
| 2015/0174824 A1 | 6/2015 | Gifford et al. |
| 2015/0224699 A1 | 8/2015 | Larsen et al. |
| 2015/0290875 A1 | 10/2015 | Mark et al. |
| 2015/0367576 A1 | 12/2015 | Page et al. |
| 2016/0144564 A1 | 5/2016 | Padgett et al. |
| 2016/0263822 A1 | 9/2016 | Boyd, IV et al. |
| 2016/0318248 A1* | 11/2016 | Susnjara ................. B29C 48/02 |
| 2017/0028434 A1 | 2/2017 | Evans et al. |
| 2017/0028633 A1 | 2/2017 | Evans |
| 2017/0028634 A1 | 2/2017 | Evans et al. |
| 2017/0203506 A1 | 7/2017 | Hjelsand et al. |
| 2018/0050502 A1 | 2/2018 | Oldani |
| 2018/0321659 A1* | 11/2018 | Dasappa ................ B29C 64/118 |

OTHER PUBLICATIONS

Oberg, Erik Jones, Franklin D. Horton, Holbrook L. Ryffel, Henry H., (2012); Machinery's Handbook (29th Edition) & Guide to Machinery's Handbook; Industrial Press, Retrieved from: https://app.knovel.com/hotink/toc/id:kpMHEGMH24/machinerys-handbook-29th/machinerys-handbook-29th.

* cited by examiner

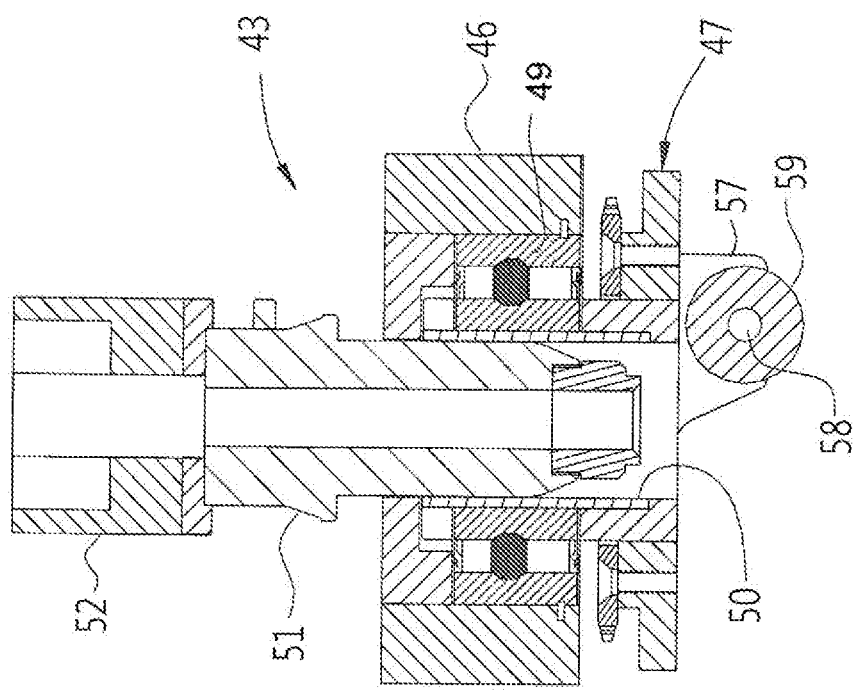
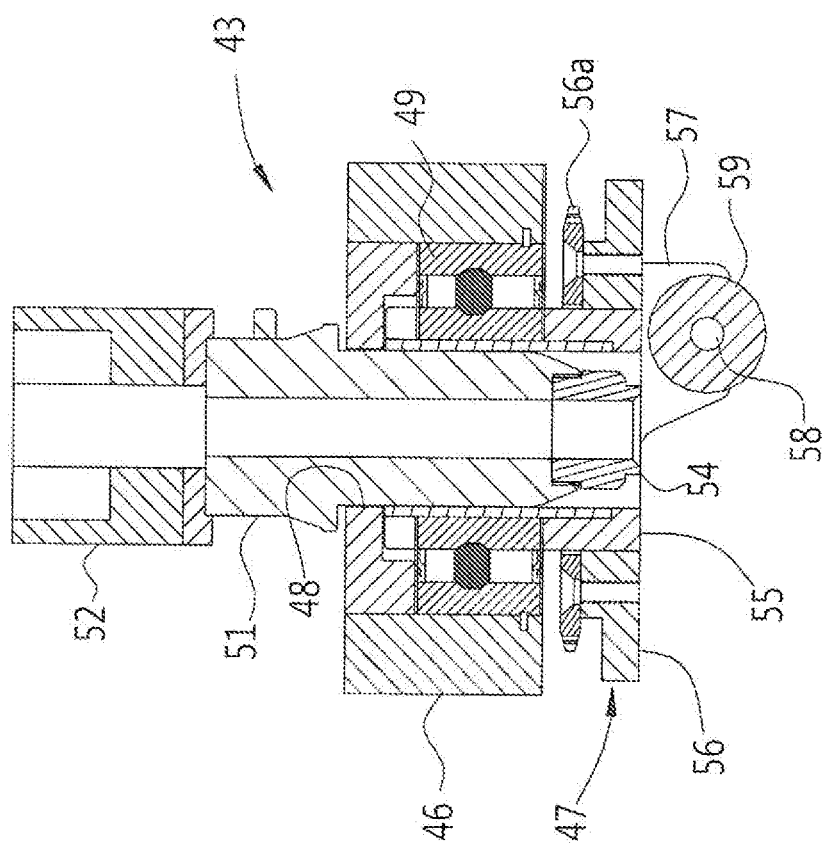
Fig. 4a
Fig. 4b

MACHINE AND METHOD FOR FORMING ARTICLES

CROSS-REFERENCE TO RELATED APPLICATIONS

This application is a continuation of U.S. application Ser. No. 18/045,048, filed on Oct. 7, 2022, which is a continuation of U.S. application Ser. No. 17/322,540, filed on May 17, 2021, which issued as U.S. Pat. No. 11,491,696 on Nov. 8, 2022, which is a continuation of U.S. application Ser. No. 16/861,490, filed on Apr. 29, 2020, which issued as U.S. Pat. No. 11,014,279 on May 25, 2021, which is a continuation of U.S. application Ser. No. 16/403,079, filed on May 3, 2019, which issued as U.S. Pat. No. 10,668,657 on Jun. 2, 2020, which is a continuation of U.S. application Ser. No. 14/980,818, filed on Dec. 28, 2015, which issued as U.S. Pat. No. 10,611,073 on Apr. 7, 2020, the entireties of which are incorporated by reference herein.

BACKGROUND OF THE INVENTION

In the prior art, there has been developed a process generally referred to as an additive manufacturing process which generally consists of forming and extruding a bead of molten thermoplastic material, applying such bead of molten material in a strata of layers to form a facsimile of an article and then machining such facsimile to provide an end product. Typically, such thermoplastic material is infused with a type of reinforcing fiber to enhance its strength. As a general practice, the molten bead, while still hot and pliable, is tamped down using an oscillating plate to create a flattened layer of material of a specific desired thickness. This process is repeated so that each layer is deposited upon an existing layer to build up a structure. When executed properly, the new material being deposited is of a temperature sufficient enough to allow it to melt and fuse with material previously deposited, thus producing a solid part. The tamping plate is generally configured as a flat plate with a center through-hole, situated concentric with the centerline of the extrusion nozzle, thus providing for effective tamping of the extruded material, regardless of the direction in which the head is moving. This tamping plate not only tamps and flattens the thermoplastic bead but also helps fuse it with the previously laid layer of material.

In the practice of the aforementioned process, several disadvantages have been encountered; most notably, air pockets, which are trapped between layers of thermoplastic material during the extrusion/deposition process, are simply tamped into the structure. In addition to creating problems during any temperature cycling that might occur after the part has cooled and hardened, such entrained air pockets invariably result in internal voids as well as surface imperfections in the final machined article. A further disadvantage of using a tamping plate is the insufficient integration of reinforcing fibers between layers. When two smooth beads of this material are forced together, the plastic component of the bead tends to fuse with the plastic component of the mating bead, with little or no reinforcing fibers crossing the area where the layers meet. Consequently, the joints between layers where there is no reinforcing, material seriously affect the structural integrity of the overall article. Additionally, the mechanism employed to quickly oscillate the tamping plate is by necessity, quite complex, expensive and difficult to maintain.

In view of the forgoing, it is the principal object of the present invention to provide an improved method of producing articles through the use of an additive manufacturing process. Another object of the invention is to provide such a machine and method functional to provide more effective fusion of engaging plies of molten material. A still further objective of the invention is to provide such improved machine and method without the requirement of complex and expensive devices.

BRIEF DESCRIPTION OF THE INVENTION

The principal object of the present invention is achieved by means of a programmable CNC machine operable in forming an article supported on a work surface disposed in an x-y plane, either fixed or displaceable along an x-axis; an extruder disposed along an axis fixed or displaceable along an x-axis, displaceable along y and z axes, rotatable about its axis and pivotal about an x-axis; means for supplying a bead of molten plastic material through such extruder; means cooperable with either such work surface or a previously applied ply of such material for guiding and compressing a portion of such bead emanating from such extruder in forming an, article consisting of stratified layers of such extruded material; a set of servomotors operable in displacing such components linearly, rotationally and/or pivotally and a suitably programmed computer for operating such motors. Such means for guiding and compressing a portion of such bead of molten material emanating from such extruder comprises a roller provided with an axis of rotation disposed along a line of intersecting of a first plane disposed perpendicular to the axis of the material emitting passageway of such extruder and a second plane disposed parallel to such passageway axis. Preferably, such bead of molten material is provided with reinforcing fibers interspersed therein which function to enhance the fusion of adjoining plies of such material, guided and compressed by such roller.

BRIEF DESCRIPTION OF THE DRAWINGS

FIG. 4a is an enlarged cross-sectional view of the material applicator head mounted on the lower end of the applicator assembly, illustrating the nozzle of a conduit for supplying a molten bead of thermoplastic material fully inserted into a passageway therethrough;

FIG. 4b is a view similar to the view of FIG. 4a, illustrating the nozzle thereof fully inserted into the passageway thereof;

DETAILED DESCRIPTION OF THE PREFERRED EMBODIMENT OF THE INVENTION

Figure 1:
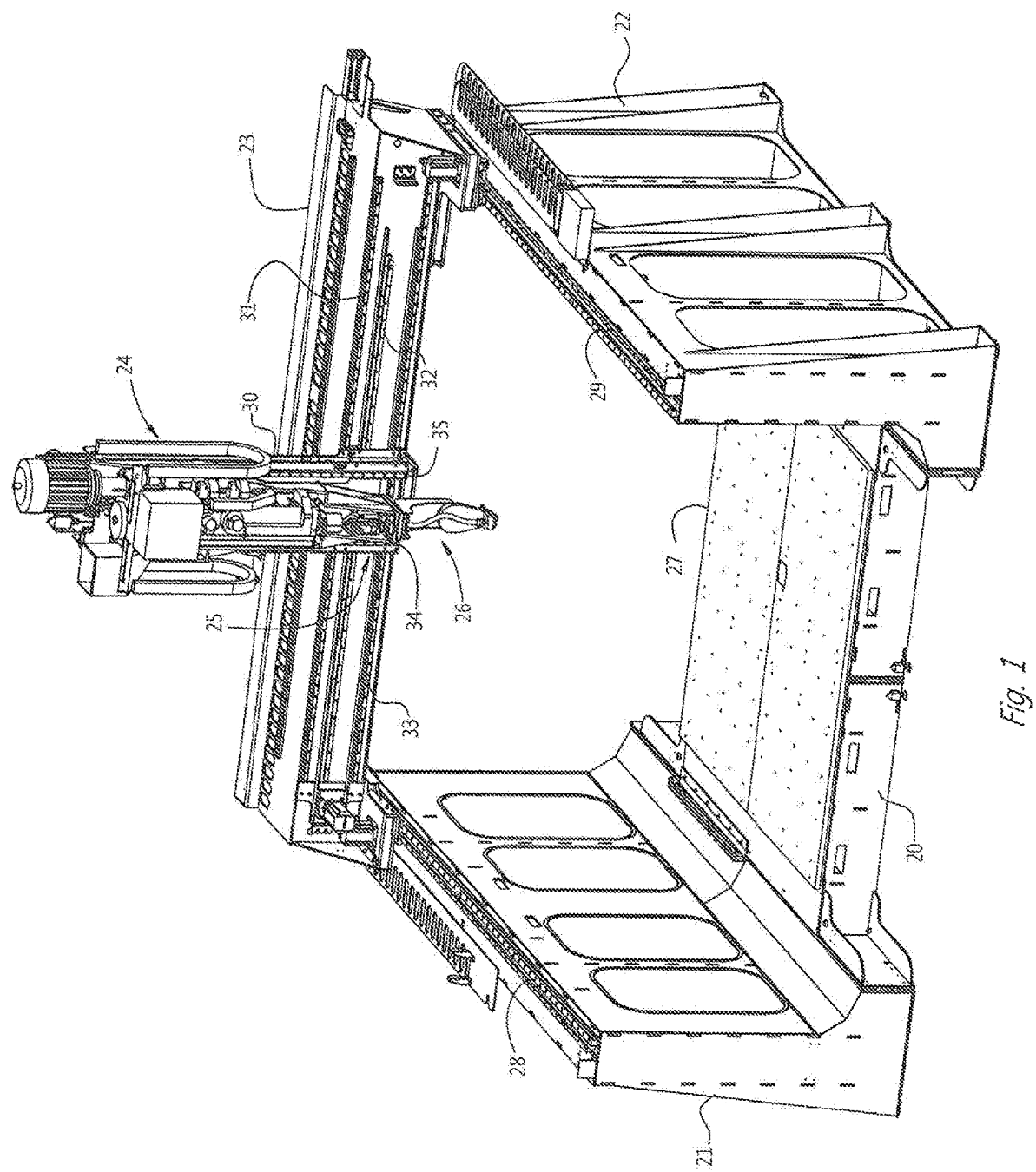
FIG. 1 is a perspective view of a CNC machine operable pursuant to an additive manufacturing process in forming articles, incorporating the present invention.

Referring to FIG. 1 of the drawings, there is illustrated a programmable computer numeric control (CNC) machine embodying the present invention which includes a bed 20 provided with a pair of transversely spaced side walls 21 and 22, a gantry 23 supported on side walls 21 and 22, carriage 24 mounted on gantry 23, a carrier 25 mounted on carriage 24 and an applicator assembly 26 mounted on carrier 25. Supported on bed 20 between side walls 21 and 22 is a worktable 27 provided with a support surface disposed in an x-y plane, which may be fixed or displaceable along an x-axis. In the displaceable version, the worktable is displaceable along a set of rails mounted on the bed by means of servomotors mounted on the bed and operatively connected to the worktable. Gantry 23 is disposed along a y-axis, supported at the ends thereof on end walls 21 and 22, either fixedly or displaceably along an x-axis on a set of guide rails 28 and 29 provided on the uppers ends of side walls 21 and 23. In the displaceable version, the gantry is displaceable by a set of servomotors mounted on the gantry and operatively connected to tracks provided on the side walls of the bed. Carriage 24 is supported on gantry 23 and is provided with a support member 30 mounted on and displaceable along a set of guide rails 31, 32 and 33 provided on the gantry. It is displaceable along a y-axis on such rails by a servomotor mounted on the gantry and operatively connected to support member 30. Carrier 25 is mounted on a set of spaced, vertically disposed guide rails 34 and 35 supported on the carriage for displacement of the carrier relative to the carriage along a z-axis. It is displaceable along such axis by a servomotor mounted on the carriage and operatively connected to the carrier.

Figure 2:
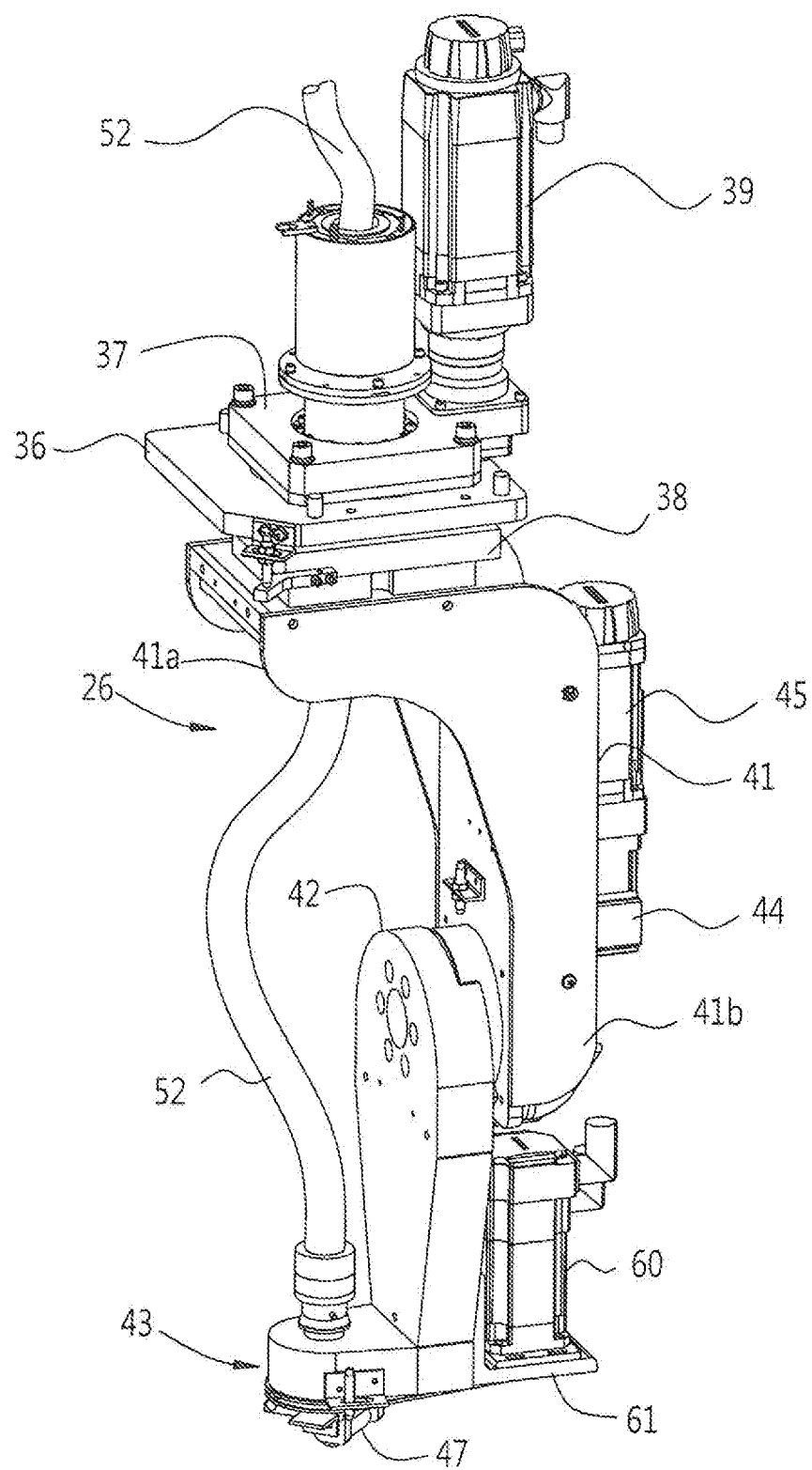
FIG. 2 is an enlarged perspective view of the carriage and applicator assembly of the machine shown in FIG. 1.

As best shown in FIG. 2, carrier 25 is provided with a base platform 36, a gear box 37 fixedly mounted in the upper side thereof and a mounting platform 38 rotatably mounted on the underside thereof, provided with openings therethrough disposed along the z-axis of the carrier. Such gear box is provided with a gear arrangement provided with an opening therethrough disposed coaxially with the aligned openings in gear box 37 and platforms 36 and 38, operatively connected to platform 38 for rotation about such x-axis, and rotatable about such axis by means of a servomotor 39 mounted on base platform 36 and operatively connected to such gear arrangement.

Applicator assembly 26 includes an upper segment 41 (e.g., a proximal segment) and a lower segment 42 (e.g., a distal segment). Segment 41 includes a transverse portion 41a secured to the underside of mounting platform 38 for rotational movement about the z-axis, provided with an opening therethrough along such z-axis, and a depending portion 41 disposed laterally relative to such axis. Segment 42 consisting of a housing disposed on an inner side of depending segment portion 41b, is mounted on a shaft journalled in a lower end of portion 41b, intersecting and disposed perpendicular to the z-axis of carrier 25, and further is provided with a laterally projecting application head 43 at a free end thereof. Mounted on a bracket 44 provided on an outer side of segment portion 41b is a servomotor 45 operatively connected to the shaft journalled in portion 41b for pivotally displacing segment 42 in y-z plane.

Figure 5:
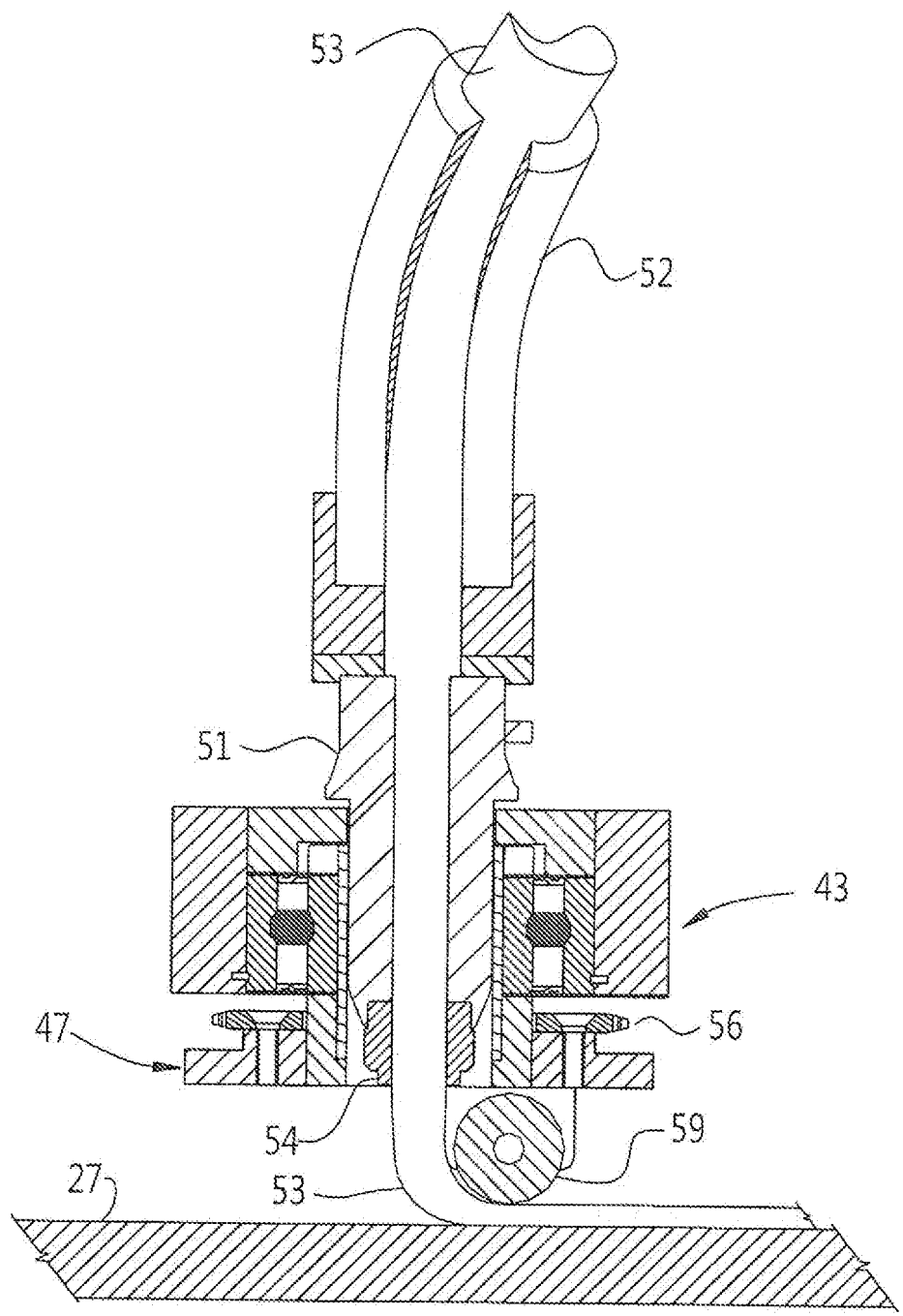
FIG. 5 is a view similar to the view shown in FIG. 4a, illustrating a bead of molten material being extruded by the applicator bead shown in FIG. 4a onto a work surface, and a roller thereof engaging and compressing a portion of such bead against, such work surface, forming a ply of an article being formed.

Referring to FIGS. 4a and 4b, applicator head 43 includes a housing 46 mounted on and projecting laterally from the lower end of segment 42, and a bracket 47. Housing 46 is provided with a passageway 48, which may be a cylindrical opening, therethrough provided with an enlarged portion, a roller bearing 49 mounted in such enlarged portion of such opening and a cylindrical sleeve 50 disposed in such enlarged portion, mounted on the inner race of such bearing, having an inner diameter corresponding to passageway 48, which may be a cylindrical opening, and including a portion extending beyond housing 46. Housing passageway 48 and sleeve 50 are configured to receive therein a nozzle 51 of a flexible conduit 52 for conveying and extruding a molten bead 53 of a thermoplastic material through such nozzle provided with an output die 54 as shown in FIG. 5.

Bracket 47 includes an annular base portion 55 coaxially mounted on the lower, exposed end of sleeve 50 and rotatable with sleeve 50 about the axis thereof, an annular plate portion 56 coaxially mounted on annular base portion 55 and spaced axially relative to bearing 49, and a sprocket 56 a mounted on base portion 55, coaxially on exposed portion 55. Bracket 47 further includes a pair of spaced depending brackets 57, 57 supporting a shaft 58 on which there is mounted a rotatable roller 59. The axis of rotation of shaft 58 is disposed along the line of intersection of a first plane disposed perpendicular to the axis of passageway 48, which may be a cylindrical opening, and a second plane disposed parallel to such axis.

Figure 3:
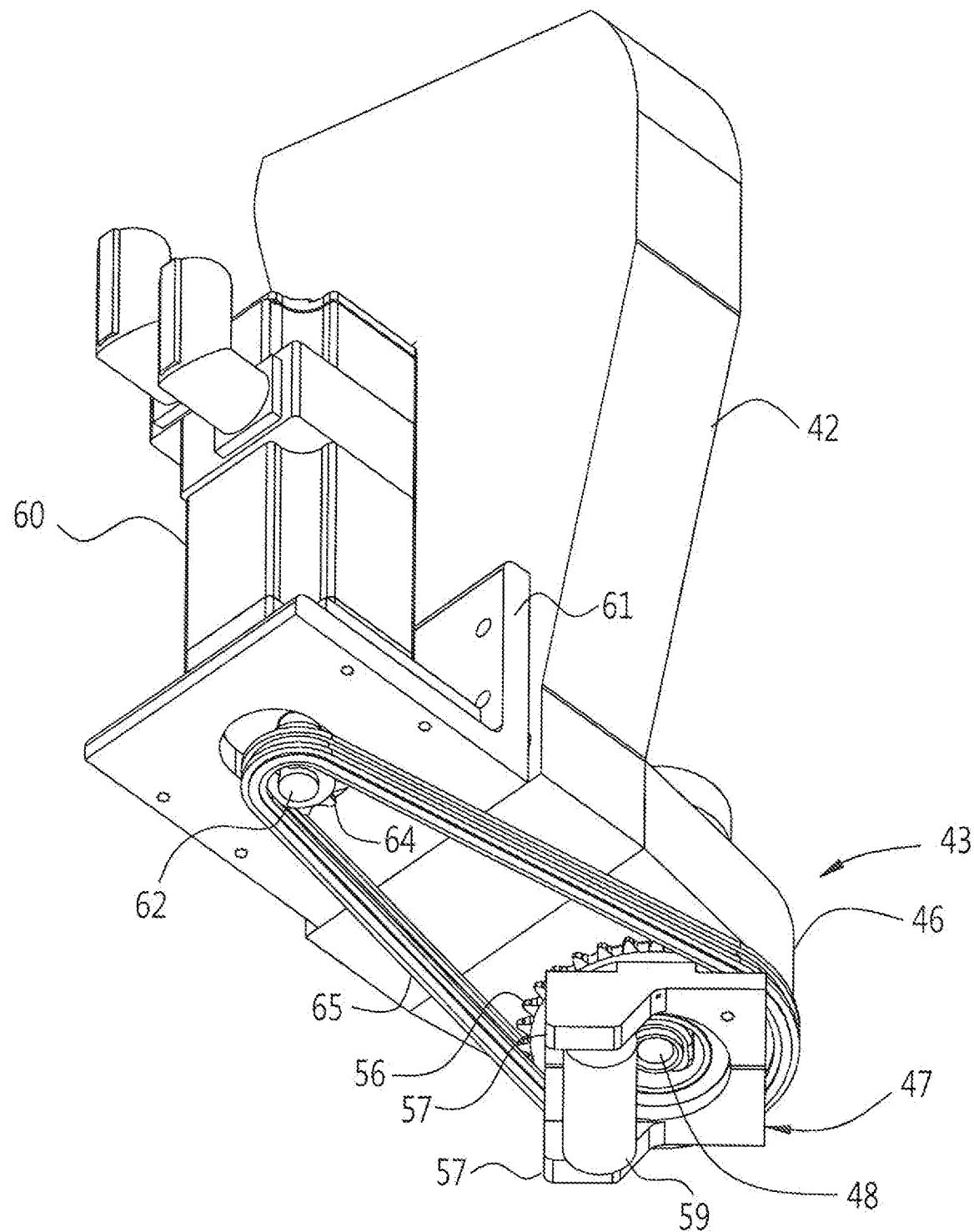
FIG. 3 is an enlarged perspective view of the lower segment of the applicator assembly shown in FIG. 2.

As best shown in FIG. 3, bracket 47 is rotatably displaceable about the axis thereof by a servomotor 60 supported on an L-shaped bracket 61 mounted on a lower rear side of lower applicator segment 42, having an output shaft 62 projecting through an opening 63 in bracket 61, provided with a sprocket 64 drivingly connected to sprocket 56 by means of a belt 65.

Conduit 52 consists of an elongated, flexible material for conducting a molten bead of a thermoplastic material under pressure from a source disposed on carrier 25 or another source, to applicator head 43. An intermediate portion of such conduit is routed through the openings through gear box 37, support platform 36 and mounting platform 38, along the z-axis of carrier 25. Such material is heated sufficiently to form a molten bead thereof, readily guide such bead through conduit 52 and extrude it through applicator head 43 in forming a strata of plies fusing together in forming an article. Such material supplied through such conduit and extruded to form an article may be provided with fibers which facilitate and enhance the fusion of extruded, engaging plies.

In the use of the machine as described in forming an article pursuant to the additive manufacturing method, with the machine suitably programmed and activated, a bead of molten material would be extruded along a defined path either on support surface 27 of the machine or previously extruder plies of such material, ahead of the path of roller 59, and caused to be engaged and compressed by such roller either against such support surface of a previously applied heated ply of material, fusing such plies together to form an object consisting of a strata of material plies fused together forming either an end product or an oversized, near duplicate thereof.

In the course of forming such article, the control system of the machine, in executing the inputted program, would operate the several servomotors as described to displace the support surface or gantry along the x-axis, displace the carriage along the y-axis, displace the carrier along a z-axis, pivot lower applicator segment 42 about an axis disposed in an x-y plane and rotate bracket 47 about a z-axis thereof, pursuant to the inputted program, to provide the described end product or an oversized, near duplicate thereof.

Figure 6B:
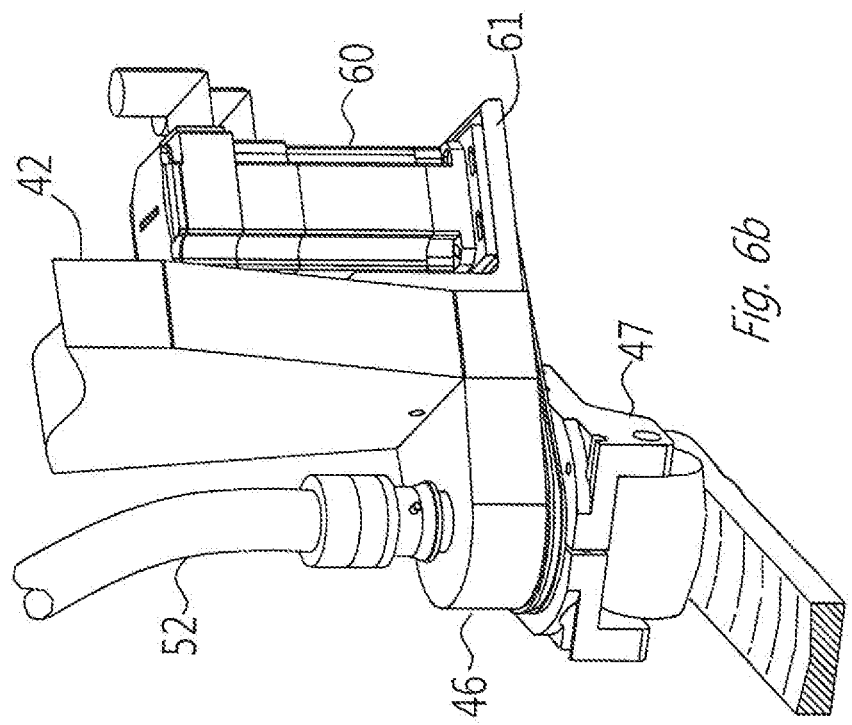
FIG. 6b is a view similar to the view shown in FIG. 6a but with a roller formed with a transversely curved configuration.
Figure 6A:
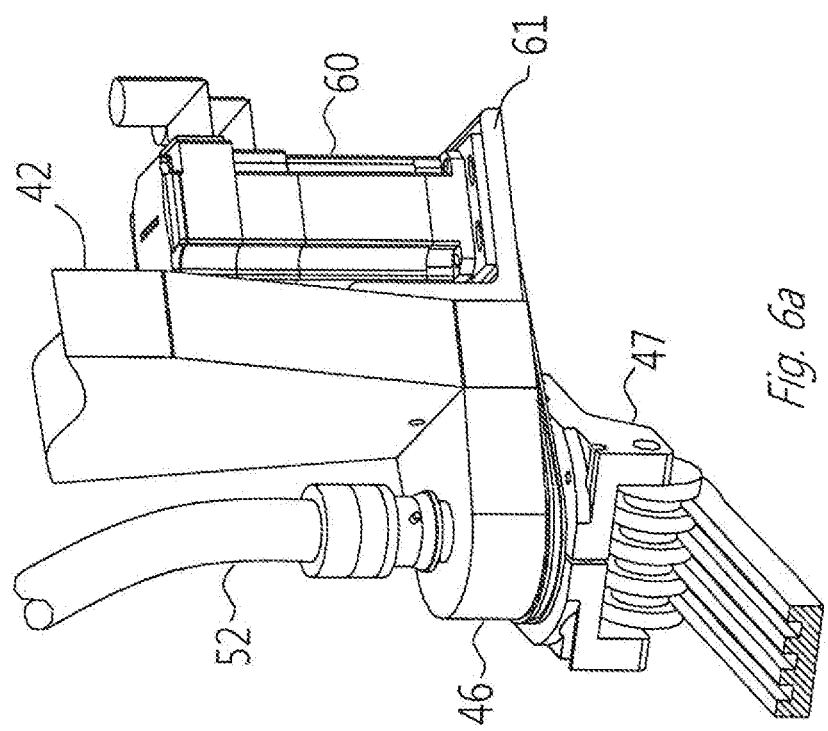
FIG. 6a is an enlarged perspective view of the lower end of the assembly shown in FIG. 2, provided with a roller formed with transversely spaced grooves.

The bead engaging portion of roller 59 may be cylindrical as shown in FIG. 5, serrated as shown in FIG. 6a or curved along the length thereof as shown in FIG. 6b. In circumstances where reinforcing fibers are provided in the molding material applied, it is preferred to utilize a roller with an irregular surface as shown in FIG. 6a which is effective in causing outlying portions of such fibers to engage and penetrate heated adjacent plies, enhancing the fusion of such plies.

In the practice of the invention as described, an article may be formed simply by forming a strata of plies defining the intended final configuration of the article; forming a strata of plies defining an interim configuration minimally exceeding the intended final configuration and then machining such interim configuration to provide the final configuration thereof; providing a permanent substructure preferably of a metal, having a configuration smaller than the intended final configuration of the article, and forming a strata of plies on such substructure providing the intended final configuration of the article; providing a permanent substructure preferably of a metal, having a configuration smaller than the intended final configuration of the article, forming a strata of plies on such substructure in forming an interim configuration slightly greater than the intended final configuration and then machining such interim configuration to provide the intended final configuration; providing a mold having a configuration smaller than the intended final configuration of the article, forming a strata of plies on such mold slightly greater than the intended final configuration of the article, machining such interim configuration to provide the final configuration of the article and then removing such mold; and providing a mold having a configuration smaller than the intended final configuration of the article, forming a strata of plies on such mold slightly greater than the intended final configuration of the article, machining such interim configuration to provide the final configuration of the article and then removing such mold.

From the foregoing detailed description, it will be evident that there are a number of changes, adaptations and modifications of the present invention, which come within the province of those persons having ordinary skill in the art to which the aforementioned invention pertains. However, it is intended that all such variations not departing from the spirit of the invention be considered as within the scope thereof as limited solely by the appended claims.

I claim:

1. An additive manufacturing system, comprising:
   a worktable having a horizontally-extending surface;
   an applicator assembly including a proximal end, a distal end, and a plurality of movable segments positioned between the proximal end and the distal end, wherein the movable segments include a proximal segment and a distal segment;
   an applicator head supported with the movable segments, the applicator head including a housing with a cylindrical opening and a nozzle positioned within the cylindrical opening, wherein the nozzle forms the distal end of the applicator assembly; and
   a servomotor configured to cause the distal segment to move and to change an orientation of an entirety of the applicator assembly, including the cylindrical opening within the applicator head, wherein the cylindrical opening is oriented along an axis extending through opposite ends of the applicator head.

2. The additive manufacturing system of claim 1, wherein the proximal segment and the distal segment partially overlap each other.

3. The additive manufacturing system of claim 2, wherein the servomotor protrudes outward from a side of the proximal segment.

4. The additive manufacturing system of claim 2, wherein the distal segment extends from a joint with the proximal segment to a side of the applicator head.

5. The additive manufacturing system of claim 3, wherein the servomotor is configured to cause movement of the distal segment relative to the proximal segment in a manner that changes a vertical location of the nozzle.

6. The additive manufacturing system of claim 1, further including a material conduit extending to an end of the applicator assembly.

7. The additive manufacturing system of claim 1, wherein the nozzle extends outward with respect to a bore formed by a housing of the applicator assembly, the bore being formed in a first end of the opposite ends of the applicator assembly.

8. The additive manufacturing system of claim 1, further including a compression device extending from the applicator assembly, the compression device including a roller.

9. The additive manufacturing system of claim 8, further including a bracket connected to opposite ends of the roller.

10. An additive manufacturing system, comprising:
    a material applicator assembly having a proximal end and a distal end, the material applicator assembly including:
    a proximal segment;
    a distal segment connected to a side of the proximal segment;
    a motor configured to change an orientation of the distal segment relative to the proximal segment;
    a material applicator head supported by the proximal segment and the distal segment, the material applicator head including a housing with a cylindrical opening and a nozzle positioned within the cylindrical opening; and
    a flexible conduit configured to guide thermoplastic material via the cylindrical opening to a position of the distal segment that is changed with the motor, the material applicator head forming a portion of the distal segment.

11. The additive manufacturing system of claim 10, wherein the material applicator assembly protrudes laterally from the distal segment.

12. The additive manufacturing system of claim 10, wherein the proximal segment and the distal segment are movable members of a CNC machine.

13. The additive manufacturing system of claim 10, wherein the motor protrudes outward with respect to a lateral surface of the proximal segment or of the distal segment, the motor configured to cause rotation of the distal segment with respect to the proximal segment.

14. The additive manufacturing system of claim 13, wherein the distal segment extends from a joint at a side of the proximal segment to an end of the material applicator assembly.

15. The additive manufacturing system of claim 14, wherein the motor is configured to cause movement of the proximal segment relative to the distal segment in a manner that changes a vertical location of the material applicator head.

16. The additive manufacturing system of claim 10, further including a conduit extending to an end of the material applicator assembly and positionable so as to include a portion that forms an angle with a vertical direction.

17. The additive manufacturing system of claim 10, further including a compression roller that extends outward with respect to a bore formed by a housing of the material applicator assembly.

18. The additive manufacturing system of claim 17, wherein the compression roller is secured by a bracket connected to a sprocket of the material applicator assembly.

19. The additive manufacturing system of claim 18, wherein the compression roller and the bracket are rotatable with the sprocket.

* * * * *